Figure 1:
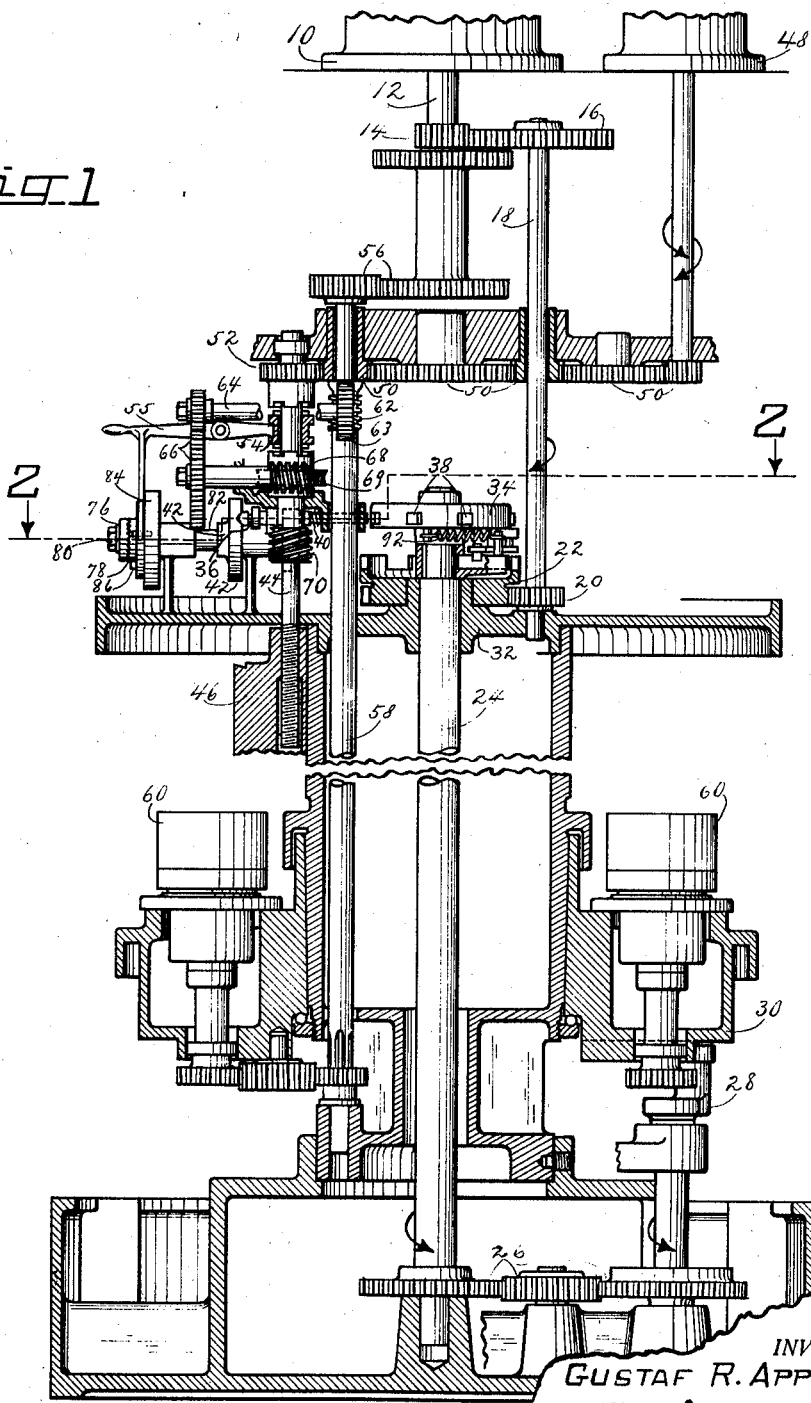

July 13, 1937.  G. R. APPELBERG  2,086,837

STROKE CONTROL ADJUSTMENT FOR MACHINE TOOLS

Filed Feb. 24, 1936  2 Sheets-Sheet 1

INVENTOR.
GUSTAF R. APPELBERG
BY
H. T. Sperry
ATTORNEY

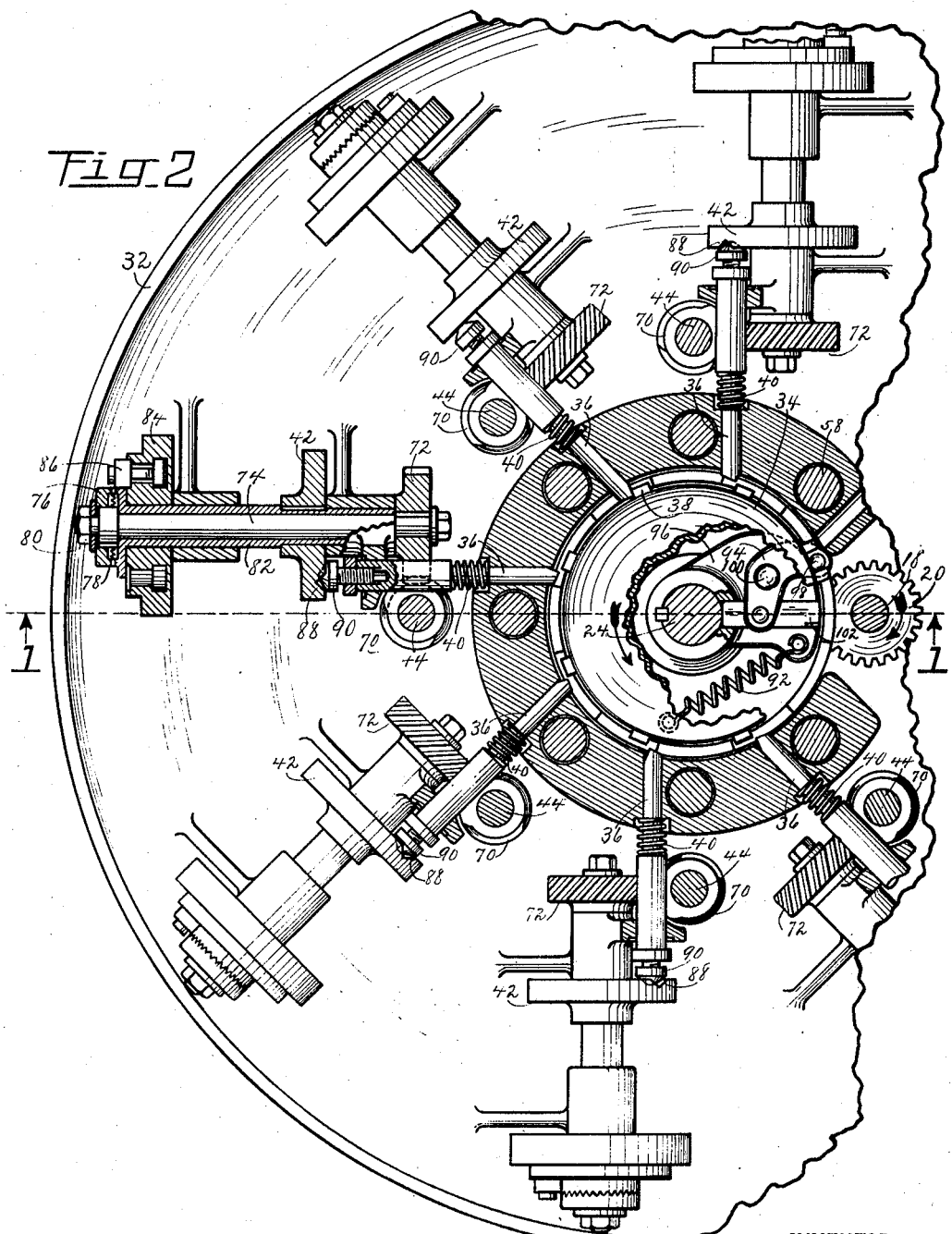

Patented July 13, 1937

2,086,837

UNITED STATES PATENT OFFICE 2,086,837

STROKE CONTROL ADJUSTMENT FOR MACHINE TOOLS

Gustaf R. Appelberg, Bridgeport, Conn., assignor to The Bullard Company, a corporation of Connecticut Application February 24, 1936, Serial No. 65,408

14 Claims. (Cl. 29—38)

This invention relates to machine tools, and the like, and is related to the coordination and the interrelation of parts and particularly to the relation of tool head strokes in multiple tool head indexing type machine tools of the general character described in the patent to E. P. Bullard, Jr., No. 1,360,175, filed November 23, 1920, for Multiple spindle machine tool.

It is among the objects of the invention to provide means for rendering the operation of the tool heads, of a multiple head machine tool, independent, one from another, so that various adjustments in the characteristics of the tool head movement may be made independently between the heads.

Another object is to provide for such independence of operation without disturbing the coordination of the operations of the head with the indexing movement of the machine.

A further object is to provide means for accomplishing a two-fold, independent adjustability of heads whereby the raised or zero position of the heads may be independently adjusted, one from another, and/or the length of tool head movement may be independently adjusted between the heads.

With these objects in view, it is also among the objects mentioned to provide means for accomplishing the above desiderata by a simple, efficient and readily adjustable structure which lends itself to both ease in operation and economy in manufacture.

These, and other objects and features of the invention, will be more fully understood, and appreciated, from a consideration of the following specification taken in conjunction with the accompanying drawings in which:

Figure 1 is a vertical, sectional view of a multiple operation machine tool embodying one form of the present invention; and Figure 2 is a horizontal section taken on the line 2—2 of Figure 1.

In apparatuses of the type to which the present invention, as shown, is applied, a work table, or carrier, supporting a plurality of work pieces, is arranged for step-by-step indexing movement to position the work pieces in consecutive relation to a group of tool heads, each of which performs its particular operation upon the work. In such machines, it is, of course, important to coordinate the indexing movement with the actuation of the tool heads in such a manner as to most efficiently use the available time, and so as to ensure the tool heads being out of relation with the work during such indexing movement.

To this end, it is usual to provide for the initiation of the indexing movement only after each tool head has reached its inoperative or zero position. Therefore, it is expedient to give each tool head, through its driving means, a controlling function in the initiation of the indexing cycle so that such indexing may not take place until the last tool head has completed its cycle and returned to its zero position.

The present invention carries out this theory of operation, but through the adjustment permits of variation in the zero position of the head and length of movement of the head without depriving each head of its individual function in the control of the initiation of the indexing cycle.

Referring more particularly to the structure, each individual tool head is provided with its own feed works mechanism, including shiftable clutches for starting down traverse movement, feed movement and return traverse movement; the control of the clutches being actuated by a timing disk, settable dogs upon which may actuate the clutches in a predetermined timed sequence individually for each head. Associated with the disk, but independently adjustable with respect thereto, is an indexing control plate arranged so that, at a predetermined position, it will release the indexing mechanism insofar as that head is concerned. The adjustment of the release mechanism, with respect to the control disk, permits the control disk to be set to give varying characteristics of tool cycle to independent heads, but still maintaining the interrelation of the tool heads control over the indexing release.

More specifically the invention embodies a control plate by which locking pins are moved to release the indexing mechanism of the machine. The control plate is adjustable, with respect to the drive means therefor, and with respect to means controlling the feed and traverse movements of the slide, so that the length of the feed and traverse is variable and the time, at which these movement are initiated in the operating cycle, may be altered to adapt the machine for any desired machining operation.

In that form of the invention, as illustrated in the drawings, a main driving motor 10 is provided, having a shaft 12 with a gear 14 thereon meshing with a gear 16 on a shaft 18. A gear 20, on the lower end of the shaft 18, engages a gear 22 to actuate an indexing mechanism upon the completion of each machining operation and after all of the tool slides have moved to their raised or zero positions.

The indexing mechanism may be of any preferred or suitable type, such as that shown in the copending application of Edward P. Bullard and Ernest H. Johnson, Serial No. 39,234, entitled "Carrier mechanisms", and may be driven by a shaft 24 which acts, through gears 26, to rotate an indexing crank arm 28 and move a spindle carrier 30, step-by-step, from one position to another between successive machining operations.

The gear 22 is loosely mounted on a web 32 of the frame and serves to drive the indexing drive shaft 24, when connected thereto, by release of a controller 34. The controller is held against rotation during movement of the tool slides by radially arranged slidable pins 36 which are movable to engage lugs 38 on the controller. These pins are urged outwardly away from the lugs 38 by springs 40, but are held in engaged position by control plates 42 which are driven from feed screws 44 by which tool slides 46 are actuated.

Traverse of the tool slides is effected by means of a separate traverse motor 48, as described more fully in the copending application of Edward C. Bullard, Serial No. 727,440, filed May 25, 1934, entitled "Feed works." The motor is reversible and drives a train of gears 50, which mesh with a gear 52 on the upper end of the feed screw 44 to rotate the screw at relatively high speed during traversing movement and when a clutch 54 is in its raised position.

Feed of the tool slides, during the machining operation, is effected from the main driving motor 10 and the shaft 12, through gears 56, which actuate a spindle drive shaft 58 from which spindles 60 are driven. A worm 62, located near the upper end of the spindle drive shaft 58, engages a gear 63 on a shaft 64 to drive gears 66, and a worm 68 engages a gear 69 to actuate the feed screw and the tool slide during the machining operation and when the clutch 54 is in its lowered position.

The control plates 42, by which the pins 36 are actuated, are driven from the feed screws 44 by worms 70 which engage gears 72 on the inner end of shafts 74. The outer end of the shaft is provided with a member 76 having notches, or other positioning means, 78 thereon which, when a nut 80 is tightened, retain the member 76 in fixed position with a sleeve 82. By suitable lost motion, the connection between a disk 84 and the sleeve 82 and the distance of traverse movement before the clutch 54 is actuated to start feed may be varied. The control plate 42 and the timing disk 84 for actuating the clutch member 54, through an arm 86, are carried by the sleeve 82, and are adjustable in angular relation to the shaft 74 upon loosening of the nut 80. Thus, by loosening the nut 80 and rotating the sleeve 82, the arc through which the control plate and timing disk must rotate before the pin 36 is allowed to be retracted by its spring 40, and the controller 34 released to actuate the indexing mechanism may be increased or decreased.

The control plate is formed with a recess 88 into which an adjustably positioned head 90, of the pin 36, moves when the control plate is rotated to a predetermined position by the feed screw. The length of the stroke of the tool slide, in both feed and traverse, may be varied by adjusting the position of the clutch actuating dogs 86 whereas the timing, for release and operation of the indexing mechanism, may be changed by adjusting the position of the sleeve 82 with reference to the shaft 74 and the feed screw 44. These adjustments may be made on the operating means for each tool slide of the machine to change the stroke of one or all of the tool slides by simple and easy manipulations and release of the indexing means prevented until all of the pins 36 are retracted and all of the slides are in their raised or zero position.

Release of the controller 34, by retracting all of the pins 36, permits the controller to move in the direction of the arrow in Figure 2 relative to the gear 22 under the action of a spring 92. A bell crank 94, carried by an arm 96, keyed to the shaft 24, is formed with a pin 98 which engages a recess in the controller 34 and is rocked about its pivot 100 when the controller is released. The inner end of the bell crank is provided with a pin engaging locking bolt 102 which, when the bell crank is actuated, is moved outward into locking engagement with a recess in an upper extension of the gear 22, thus locking the gear 22 to the shaft 24 for actuating the indexing mechanism.

In the operation of the machine, the timing disks and the control plates are set to cause each tool slide to have the desired stroke and to cause the pin 36, associated therewith, to be retracted when the tool slide has been raised in its zero position. When the last of the tool slides reaches its zero position, the last of the pins 36 will be retracted allowing the controller to rotate under the action of the spring 92 so that the bell crank is rocked and the lock bolt 102 projected to connect the gear 22 to the shaft 24 for actuating the indexing mechanism. The spindle carrier and spindles are then moved, or indexed, to a new position for another machining operation.

When the type of machining operation, or the work to be done on the machine, is to be changed, the stroke of the tool slides can be changed as required by simple adjustments of the sleeve 82.

When applied to other types of machine tools, than that illustrated, and when used in combination with other elements, or other machine tools, or mechanism, the invention may embody means which are formed, constructed and arranged very differently from those herein shown and described. It should, therefore, be understood that the embodiment of the invention herein set forth is intended solely to illustrate a typical form and arrangement thereof and is not intended to limit the scope of the invention.

Having set forth the nature of my invention, what I claim is:

1. A multiple operation machine tool having in combination a plurality of tool slides and a work carrier, indexing means for bringing said tool slides and successive pieces of work into operative relation, a feed screw for actuating said tool slide, an element for controlling the operation of said indexing means actuated by said feed screw and means for adjusting the position of said element with respect to said feed screw.

2. A multiple operation machine tool having in combination a plurality of tool slides and a work carrier, indexing means for bringing said tool slides and successive pieces of work into operative relation, an element controlling the operation of the tool slides, another element controlling the operation of the indexing means, a feed screw for the tool slide and means for actuating said element driven by said feed screw.

3. A multiple operation machine tool having in combination a plurality of tool slides, a work carrier, means for indexing the work carrier with respect to said tool slides, an element controlling the operation of the tool slides, another element controlling the operation of said indexing means, a feed screw for each slide and common means for actuating one of said elements driven by said feed screws and adjustable with respect thereto.

4. A multiple operation machine tool having in combination a plurality of tool slides, a work carrier, means for indexing the work carrier with respect to said tool slides, feed and traverse drive means for said tool slides, a feed screw actuated by said feed and traverse drive means, an element controlling the operation of said indexing means, another element controlling the operation of said tool slides and means for actuating said elements driven by said feed screw and adjustable with respect thereto.

5. A multiple operation machine tool having in combination a plurality of tool slides, a work carrier, means for indexing the work carrier with respect to said tool slides, feed and traverse drive means for said tool slides, a feed screw for actuating said tool slide, a clutch for establishing a driving connection between said feed screw and either said feed or said traverse drive means, an element controlling the operation of said clutch, another element controlling the operation of said indexing means and means for actuating said elements driven by said feed screw and adjustable with respect thereto.

6. A multiple operation machine tool having in combination a plurality of tool slides, a work carrier, means for indexing the work carrier with respect to said tool slides, feed and traverse drive means, a feed screw for actuating said tool slide, a clutch for establishing a driving connection between said feed screw and either said feed or said traverse drive means, a cam for actuating said clutch, a control member for actuating said indexing means and a shaft for actuating said cam and control member driven by said feed screw.

7. A multiple operation machine tool having in combination a plurality of tool slides, a work carrier, means for indexing the work carrier with respect to said tool slides, feed and traverse drive means, a feed screw for actuating said tool slide, a clutch for establishing a driving connection between said feed screw and either said feed or said traverse drive means, a cam for actuating said clutch, a control member for actuating said indexing means, a shaft for actuating said cam and control member driven by said feed screw and means for adjusting the position of said clutch and control member with respect to said shaft.

8. A multiple operation machine tool having in combination a plurality of tool slides, a work carrier, means for indexing the work carrier with respect to said tool slides, feed and traverse drive means, a feed screw for actuating said tool slide, a clutch for establishing a driving connection between said feed screw and either said feed or said traverse drive means, a cam for actuating said clutch, a control member for actuating said indexing means, a shaft for actuating said cam and control member driven by said feed screw, a rotatable sleeve by which said cam and control member are carried and an adjustable connection between said sleeve and shaft for altering the angular relation of the cam and member with respect to said shaft.

9. A multiple operation machine tool having in combination a plurality of tool slides, a work carrier, means for indexing the work carrier with respect to said tool slides, feed and traverse drive means, a feed screw for actuating said tool slide, a clutch for establishing a driving connection between said feed screw and either said feed or said traverse drive means, a cam for actuating said clutch, a control member for actuating said indexing means, a shaft for actuating said cam and control member driven by said feed screw, a rotatable sleeve by which said cam and control member are carried, means for adjusting the relative positions of said cam and member and means for adjusting the relative positions of said sleeve and shaft.

10. In a machine tool an indexible table, an indexing mechanism therefor, a clutch for controlling the operations of said indexing mechanism, a plurality of individually settable instrumentalities adapted for actuation between the indexing movements of the carrier and means, jointly controlled by all of said instrumentalities, for mechanically releasing said clutch to inaugurate indexing movement.

11. In a machine tool having an indexible carrier, an indexing mechanism therefor, a clutch for controlling said mechanism, a plurality of instrumentalities operable between the indexing movements of the carrier, means associated with each instrumentality for restraining the engagement of the indexing clutch and adjustable means individual to each instrumentality for permitting the releasing of its restraining means.

12. In a machine tool having an indexible carrier, an indexing mechanism therefor, a clutch for operating said indexing mechanism, a plurality of feed works and an adjustable restraining device associated with each feed works for restraining the indexing clutch.

13. In a machine tool having a feed works, a timing disk associated therewith and having an indexing device, a clutch for controlling the same, the combination with the timing disk of means adjustable with respect thereto for restraining the action of the indexing clutch.

14. In a machine tool of the class described, an indexible carrier, a plurality of feed works, an indexing mechanism, a clutch for controlling the same and means operable with each feed works for restraining the action of the clutch, each of said means being adjustable with respect to its feed works so as to adjust the point in the cycle of the feed works operation at which the restraining device is released.

GUSTAF R. APPELBERG.